United States Patent [19]

Carver

[11] 4,011,530
[45] Mar. 8, 1977

[54] TWO-PATH TELEPHONE LINE EQUALIZATION SYSTEM

[75] Inventor: Lawrence M. Carver, Stamford, Conn.

[73] Assignee: TM Systems, Inc., Bridgeport, Conn.

[22] Filed: Mar. 3, 1976

[21] Appl. No.: 663,235

[52] U.S. Cl. .......................... 333/28 R; 179/2.5 R; 179/16 AA
[51] Int. Cl.² ..................... H03H 7/14; H04M 7/00
[58] Field of Search ................... 179/2.5 R, 16 AA; 333/28 R; 330/52, 151

[56] References Cited
UNITED STATES PATENTS 2,859,413   11/1958   Ketchledge ...................... 333/28 R

*Primary Examiner*—Paul L. Gensler

[57] ABSTRACT

A two-path equalizer system interposable in a telephone line carrying supervisory signals whose frequencies lie below a 3 KHz limit and data signals whose frequencies primarily lie above this limit. The system normally operates in a first path mode with respect to incoming supervisory signals, the gain in the first path being preset to a degree depending on line losses, whereby the levels of supervisory signals emerging from the output of the system are at their nominal telephone line levels. An automatic path selector is provided which is responsive only to data signal frequencies and acts to switch-over the system and render it operative in a second path mode in which incoming data signals are subjected to automatic gain control and appear at the output at their maximum line level despite variations in input level.

6 Claims, 2 Drawing Figures

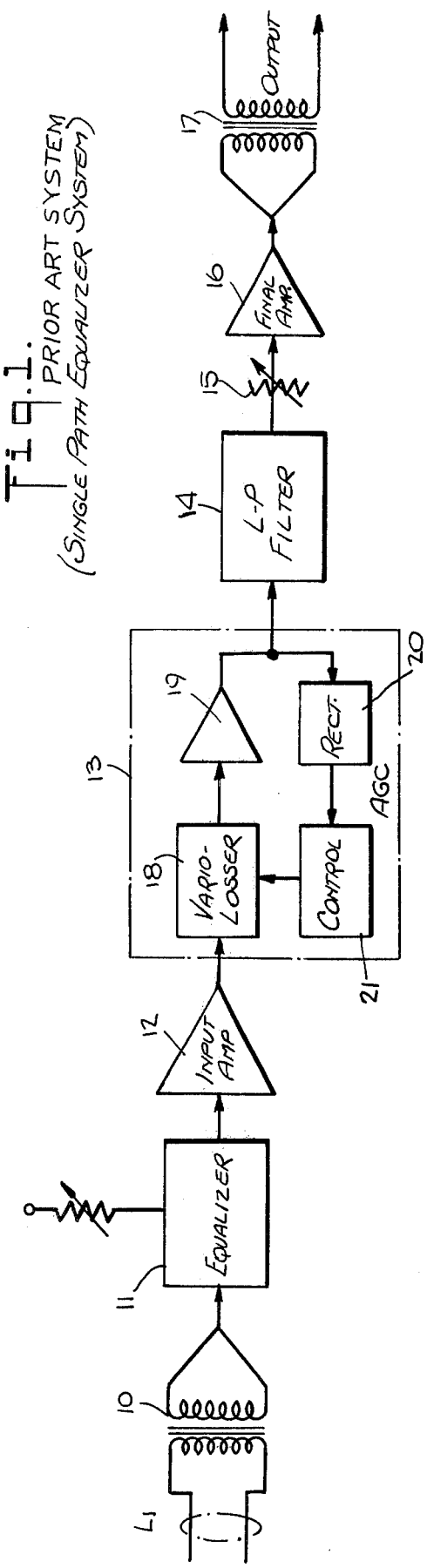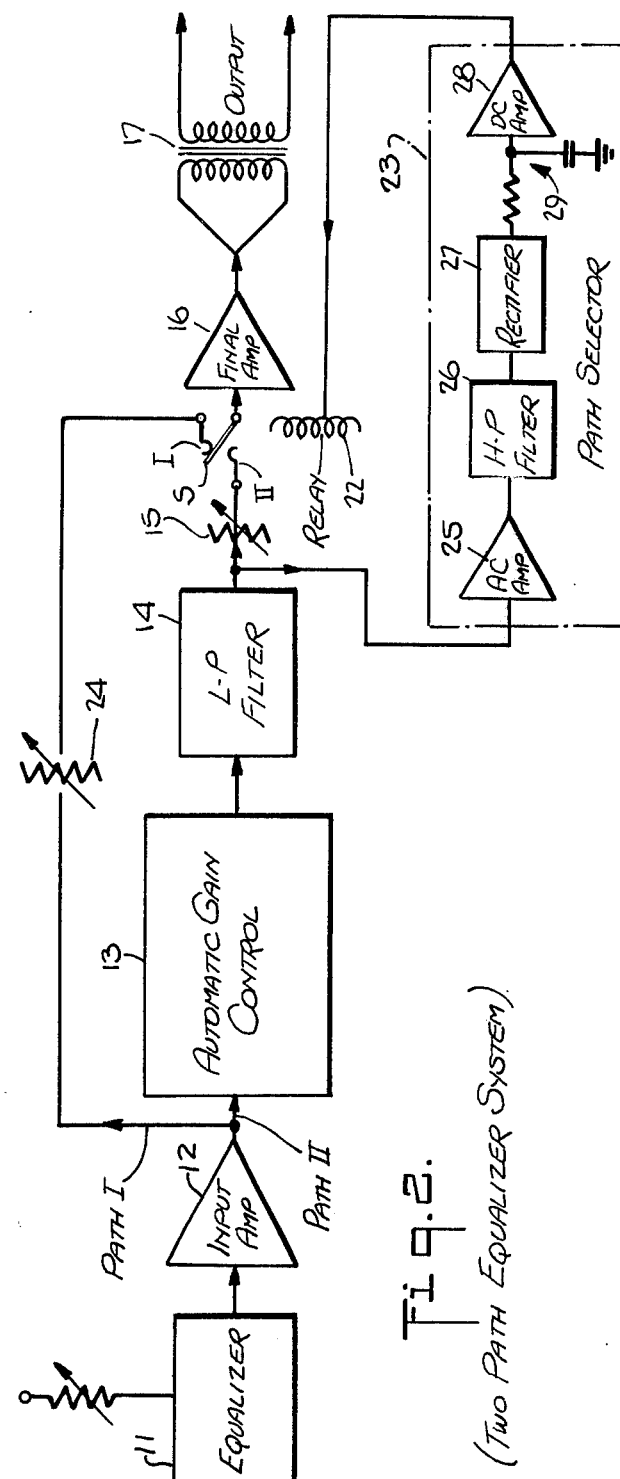

TWO-PATH TELEPHONE LINE EQUALIZATION SYSTEM

BACKGROUND OF INVENTION

This invention relates generally to equalizer systems for telephone lines, and more paticularly to a two-path equalizer system, one path of which is reserved for data signals lying within a high-frequency range and the other for supervisory signals lying within a low-frequency range.

Modern telephone communication lines not only carry voice and supervisory signals which lie within a low-frequency range whose upper limit is 3 KHz, but also serve to convey data signals in a high-frequency range whose upper limit may be as high as 70 KHz. Because ordinary telephone lines have a poor amplitude response in the high frequency range, it is the present practice to interpose a single-path equalizing system at some point in the line to afford a substantially uniform signal gain over a broad frequency spectrum extending from 10 Hz to 70 KHz. By a single path system is meant one in which all signals carried by the telephone line pass through the same system regardless of their frequencies.

A telephone line equalizer is a device adapted to correct or compensate for some specified characteristic of the line which is regarded as undesirable. By the use of an equalizer, one can improve particular line characteristics and thereby enhance the quality or grade of the transmitted signal. In the case of data signals, effective use of an equalizing system may make the difference between a circuit which is acceptable and one that is effectively inoperative.

Since the losses of a telephone line are such that its amplitude-response falls off as the frequency of the signal carried thereby increases, a single-path equalization system is adapted to provide a rising gain with an increase in frequency. Proper adjustment of the equalizer is attained when the equalizer compensates for line losses over the entire band of useful frequencies.

In known forms of single-path equalizer systems which operate in the range of 10 Hz to 70 KHz, the circuit not only functions to increase gain at high frequencies to compensate for line losses but also includes an automatic-gain-control (AGC) circuit to provide a substantially constant output level despite variations in input level.

Data signals carried by a telephone line having a single-path equalizer system interposed therein contain frequency components primarily above 3 KHz, the upper limit of the voice frequency range. On the other hand, the line also carried various types of supervisory telephone tones whose frequencies lie within the voice frequency range. Thus the following supervisory signals fall within the voice frequency range: Idle Tone—2600 Hz; Dial Tone—600/120 Hz; Dial Pulse—2600 Hz, interrupted; Busy Tone—600/120 Hz; Ring Signal/Ring Back—1000 Hz; Preemption Signal—800/400 Hz.

Unlike high-frequency data signals which are yielded at the output of the equalizer system at a regulated maximum zero dBm output level, supervisory signals of the type previously exemplified are best handled at the telephone exchange when they are at their nominal signal levels. These nominal levels vary in their power level values (as expressed in decibels with reference to a power of one milliwatt) from −18 dBm to −6dBm. It is therefore desirable to provide manual gain control for the supervisory signals, so that their gain may accurately be set to make up for line losses in the low-frequency range which encompasses these signals.

Inasmuch as a single-path equalizer system makes no distinction between supervisory signals and data signals, this system precludes separate manual gain control for the supervisory signals, and therefore is incapable of supplying supervisory signals to the line at their nominal signal levels.

SUMMARY OF INVENTION

In view of the foregoing, the main object of this invention is to provide a two-path equalizer system, one path of which amplifies supervisory signals with an amplifier whose gain is manually adjustable, the other path passing data signals and including an automatic gain control circuit to hold the output signal at a substantially constant level.

A significant feature of this system over existing single-path equalizing systems is that it makes it possible to manually set the gain for the supervisory tones to make up for line losses in the low-frequency range where these tones are found while supplying data signals at a regulated output level.

More specifically, it is an object of this invention to provide a two-path equalizer system which includes an automatic path selector to render the system operative in the path mode appropriate to the frequencies of the incoming signals.

Still another object of the invention is to provide a two-path system which is of relatively simple, low-cost design and which operates efficiently and reliably.

Briefly stated, these objects are attained in a two-path system which is interposable in a telephone line carrying supervisory signals whose frequencies lie below a 3 KHz limit and data signals whose frequencies primarily lie above this limit, the system including an input circuit coupled to the line to receive the incoming signals which are applied to an equalizer adapted to compensate for line losses over the entire range of incoming frequencies. Also provided is an automatic gain control circuit, a manually-adjustable gain control device and an output amplifying circuit coupled to the line to feed equalized signals thereto.

The system arrangement includes a first path in which the incoming signals received by the input circuit are fed through the equalizer and via the manually-adjustable gain control device to the output circuit. Also provided is a second path in which the signal from the equalizer passes to the output circuit via the automatic gain control circuit.

The system is transferable from operation in the first path mode to operation in the second path mode by a switch which, when unactuated, maintains the system operative in the first path mode. Actuation of the switch is effected by an automatic path selector which is responsive only to frequencies in the data signal range, so that only data signals pass through the second path.

Thus the system normally operates in the first path mode to pass supervisory signals to the output circuit with a gain which is preset to a degree depending on line losses, whereby the supervisory signals in the output are at their nominal telephone line levels. When the system functions in the second path mode to pass only data signals, the signals which are then subject to automatic gain control appear in the output at a maximum line level despite variations in input level.

Both paths in the equalizer pass signals from 10 Hz to 70 kHz. The initial application of data signals utilizes the first path mode for one or two seconds before switching takes place over to the second path. It is desirable to have the initial data signals equalized and set for approximately correct amplitude for this period. While the prime components of the data signals are above 3 kHz, some components during traffic may fall below 100 Hz. These must be passed during the second path mode. These considerations preclude the possibility of using a low-pass filter in the first path and a high-pass filter in the second path wherein both paths could be combined at the output and no switching would be required.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a single-path equalizer system of the prior art type; and FIG. 2 is a block diagram of a two-path system in accordance with the invention.

DESCRIPTION OF INVENTION

Prior Art Single Path Systems

Referring now to FIG. 1, there is shown a known type of single-path equalizer system which is interposed in a telephone line $L_1$ carrying data signals as well as supervisory signals. The system includes a transformer 10 coupled to the line to provide a balanced input, incoming signals being fed by the input transformer to an adjustable equalizer 11 of standard design. The equalizer system provides gain over the entire frequency spectrum from 10 Hz to 70 KHz. This spectrum includes the voice frequency range whose upper limit is 3 KHz, within which lie the various low-frequency supervisory tones.

Equalizer 11 is adjustable for increased gain at higher frequencies to correct for line losses, the output of the equalizer being applied to an input amplifier 12 to provide gain to make up for equalization losses. The output of input amplifier 12 is fed to an automatic gain control (AGC) circuit 13, the signal therefrom passing successively through a low-pass filter 14, a potentiometer 15 to adjust the output level, a final amplifier 16 and an output transformer 17 which returns the equalized signals to the line.

The AGC circuit includes a vario-losser 18 in series with an amplifier 19. The loss factor of the vario-losser is automatically varied by a feedback loop constituted by a rectifier 20 coupled to the output of amplifier 19 to produce an analog control voltage for governing a control device 21 operatively coupled to vario-losser 18. Because of the AGC circuit, the level of signal fed to the line by output transformer 17 is maintained substantially constant despite variation in the input level of the signal. Low-pass (L-P) filter 14, which is optional, reduces noise by suppressing signals whose frequencies lie above the operating band.

The drawback to this single-path equalizing system is that it draws no distinction between supervisory telephone tones whose frequencies all lie below 3 KHz and data signals whose frequencies are above this limit. It is not possible, therefore, with this arrangement to effect separate manual gain control of the supervisory tones.

Two-Path System

Referring now to FIG. 2, there is shown a two-path system which makes possible separate manual gain control of the supervisory tones, yet retains all of the necessary equalization features. Operation of the system in either a first path mode (Path I) or in the second path mode (Path II) is effected by means of a switching relay 22 whose movable armature S normally engages an upper fixed contact I. When the coil of relay 22 is energized and the relay switch actuated, the armature shifts to engage a lower fixed contact II. Actuation of the relay is effected by a path selector, generally designated by numeral 23.

When relay 22 is actuated to engage contact II, the system is then operative in the Path II mode, and in this mode the equalizer arrangement is identical to the single-path system shown in FIG. 1. Thus when operative in the Path II mode, a telephone line signal received by input transformer 10 then passes successively through and is processed by equalizer 11, input amplifier 12, automatic gain control 13, L-P filter 14, output level potentiometer 15, final amplifier 16 and output transformer 17.

When relay 22 is unactuated and armature S assumes its normal state to engage fixed contact I, the resultant Path I is defined by input transformer 10, equalizer 11 and input amplifier 12, all of these being common to the second path. However, in the Path I mode, the output of input amplifier 12 is fed through a manually-adjustable gain control potentiometer 24 through contact I of the relay to output amplifier 16, so that in the Path I mode the line signal in the Path I mode bypasses the AGC circuit 13, L-P filter 14 and lever control 15.

The system is rendered operative in the Path II mode only when data signals yielded in the output of L-P filter 14 and having frequencies above 3 KHz pass through an input amplifier 25 in path selector 23, and through a high-pass (H-P) filter 26 which discriminates against low-frequency signals. The output of H-P filter 26 is rectified in a rectifier 27 to provide a d-c control voltage which is amplified in a d-c amplifier 28 to a level sufficient to actuate relay 22 coupled to the output thereof.

Rectifier 27 is provided with an R-C delay network 29 to defer actuation of relay 23. When data signals are first received by the equalizer system, they proceed initially through Path I for a period determined by the time constant of the delay network. This period is made sufficiently long to permit the automatic gain control circuit 13 to be stabilized before the system transfers over to Path II which includes automatic gain control. In this way, the overshoot and initial transient response of the AGC circuit do not appear in the output of the equalizer system.

The initial data signals at the output of the equalizer system are therefore equalized and established at a level compensating for nominal line losses are determined by operation in the Path I mode. Thereafter, the data signals are equalized and established at a regulated maximum value of line level as determined by operation in the Path II mode. By adjusting potentiometer 15, one may set the regulated output level from output transformer 17 at a zero dBm level.

Thus the two-path equalizer system provides operation in a mode appropriate to the frequencies of the signals being processed. When the system operates in the Path I mode, the line signals in the low-frequency range below 3 KHz, including supervisory tones, go through equalizer 11, and from there through potentiometer 24 into final amplifier 16. The potentiometer permits manual gain control for the supervisory tones, the control being set for enough gain to make up for line losses in the low-frequency range where the supervisory signals exist.

The supervisory signals, whose frequencies are all below 3 KHz, though they will pass through the automatic gain control circuit 13 and L-P filter 14, and from there into the input amplifier 25 of the path selector 23, will not pass through the high-pass filter 26 of the selector and will therefore not cause a switch-over to Path II.

While there has been shown and described a preferred embodiment of a two-way equalizer system in acordance with the invention, it will be appreciated that many changes and modifications may be made therein without, however, departing from the essential spirit thereof.

I claim:

1. A two-path equalizing system interposable in a telephone line carrying supervisory signals whose frequencies lie below a 3 KHz limit and data signals whose frequencies are primarily above this limit, the system comprising:
   A. an input circuit coupled to said line to receive the incoming signals;
   B. an equalizer to compensate for line losses over the entire range of said frequencies;
   C. an automatic gain control circuit;
   D. a manually-adjustable gain control device;
   E. an output amplifying circuit coupled to said line to return equalized signals thereto;
   F. a first path in which incoming signals from said input circuit are applied through said equalizer to said output circuit via siad manually-adjustable gain control circuit;
   G. a second path in which incoming signals from said input circuit are applied through said equalizer to said output circuit via said automatic gain control circuit;
   H. a switch which, when actuated, transfers the system from operation in a first path mode to operation in a second path mode, the switch normally maintaining the system operative in the first path mode; and
   I. an automatic mode selector responsive only to signals in the data signal frequency range and coupled to said switch to actuate same whereby only data signals pass through said second path.

2. A system as set forth in claim 1, wherein an input amplifier is interposed between said equalizer and said automatic gain control circuit.

3. A system as set forth in claim 1, wherein a low-pass filter is interposed in the second path between the automatic gain control circuit and the output circuit to exclude therefrom frequencies above the frequencies of the data signals.

4. A system as set forth in claim 1, wherein said automatic selector includes a high-pass filter to pass only data signal frequencies.

5. A system as set forth in claim 4, wherein said switch is operated by a relay and wherein said high-pass filter output is applied to a rectifier circuit to provide a d-c voltage for acutating the relay.

6. A system as set forth in claim 5, wherein said rectifier circuit includes time delay means to defer actuation of said relay for a period sufficient to permit stabilization of said automatic gain control circuit.

* * * * *